(12) United States Patent
Hyde (10) Patent No.: US 7,762,603 B2
(45) Date of Patent: Jul. 27, 2010

(54) TRUCK BED SEATING APPARATUS

(76) Inventor: Carey Hyde, 262 Dublin Ct., Mableton, GA (US) 30126

( * ) Notice: Subject to any disclaimer, the term of this patent is extended or adjusted under 35 U.S.C. 154(b) by 125 days.

(21) Appl. No.: 11/725,101

(22) Filed: Mar. 16, 2007

(65) Prior Publication Data

US 2007/0216187 A1   Sep. 20, 2007

Related U.S. Application Data

(60) Provisional application No. 60/783,166, filed on Mar. 16, 2006.

(51) Int. Cl.
*B60N 2/24* (2006.01)

(52) U.S. Cl. .......................... 296/64; 296/63; 296/68.1; 296/65.02; 248/503.1

(58) Field of Classification Search ............. 296/65.03, 296/65.04, 63, 65.02, 68.1, 64; 297/503.1
See application file for complete search history.

(56) References Cited

U.S. PATENT DOCUMENTS

| | | | |
|---|---|---|---|
| 3,261,422 A * | 7/1966 | Jensen ..................... 180/89.17 |
| 3,446,527 A * | 5/1969 | Persson .................... 296/65.02 |
| 3,829,151 A | 8/1974 | Fellenstein |
| 3,840,263 A | 10/1974 | Bowden |
| 4,114,947 A * | 9/1978 | Nelson ..................... 297/344.1 |
| 4,527,828 A | 7/1985 | Groce et al. |
| D283,469 S * | 4/1986 | Zimmerman ................ D6/356 |
| 4,679,840 A | 7/1987 | Fry et al. |
| 4,911,493 A | 3/1990 | Muirhead |
| 4,978,097 A * | 12/1990 | Froutzis .................... 248/503.1 |
| 5,026,225 A * | 6/1991 | McIntyre ..................... 410/23 |
| 5,029,928 A | 7/1991 | Huber |
| 5,078,443 A | 1/1992 | Austin |
| 5,139,301 A | 8/1992 | Lewis |
| D331,896 S | 12/1992 | Pickering |
| 5,368,354 A | 11/1994 | Martin |
| D354,868 S | 1/1995 | Bowlby |
| 5,398,985 A | 3/1995 | Robinson |
| 5,497,708 A * | 3/1996 | Jeruzal ...................... 108/54.1 |
| 5,501,501 A | 3/1996 | White et al. |
| 5,516,179 A * | 5/1996 | Tidwell ....................... 296/63 |
| 6,651,469 B2 | 11/2003 | Arias |
| 6,814,411 B1 * | 11/2004 | Lin ......................... 297/440.22 |
| 6,899,378 B2 | 5/2005 | Rhodes et al. |
| 6,932,408 B1 | 8/2005 | Lyod, Jr. et al. |
| 2005/0140160 A1 | 6/2005 | Arias |
| 2006/0257223 A1 * | 11/2006 | Saldana ........................ 410/3 |

OTHER PUBLICATIONS

Riley, Alan, "Utility Track System Provides A Ton Of Activity", Roadfly, www.roadfly.com/long-term-road-tests/2006-08-15/utili-track-system-provides-a-ton-of-utility/.

* cited by examiner

*Primary Examiner*—Joseph D Pape
(74) *Attorney, Agent, or Firm*—Innovative IP, PLC; Sandra M. Sovinski

(57) ABSTRACT

An improved truck bed seating apparatus, wherein a frame is removably attached to a truck bed for supporting seating thereon, and wherein the design allows for easy removal and installation of the frame assembly and provides for a minimal use of space when the apparatus is removed.

8 Claims, 6 Drawing Sheets

_Fig_8

_Fig_9

TRUCK BED SEATING APPARATUS

PRIORITY CLAIM AND CROSS REFERENCE

To the fullest extent permitted by law, the present U.S. non-provisional patent application claims priority to and the benefit of U.S. provisional application entitled TRUCK BED SEATING APPARATUS, filed Mar. 16, 2006, having assigned Ser. No. 60/783,166, filed on behalf of inventor Carey Hyde.

TECHNICAL FIELD

The present invention relates generally to auxiliary seating structures for use in pickup trucks, and more specifically, to a truck bed seating apparatus removably mounted to a truck bed.

BACKGROUND OF THE INVENTION

One of the primary reasons for the increased popularity of the pick-up truck is the versatility of the vehicle due to its unique design. The open pickup truck bed provides the owner with many capabilities not afforded owners of cars or sport utility vehicles (SUV's), capabilities including the ability to move relatively large quantities of materials, the ability to move those materials in a compartment separate from the passenger compartment, as well as the ability to store items outside of the passenger compartment.

Because of this versatility, pick-up trucks have quickly evolved from strictly work vehicles to family recreational vehicles. Several examples of family recreational activities wherein pickup trucks are often used include camping, fishing, off-roading, hunting, and outdoor sporting events.

To further enjoy the benefits of a pickup truck, owners sometimes use the bed of the truck as a type of auxiliary passenger compartment. As new technology has developed, and as the use of pickup trucks has spread, an increasing number of owners have expanded upon the notion of using the pickup truck bed as an auxiliary passenger compartment and have installed seats in the pickup truck bed.

Such installation of seats in a pickup truck bed, although simple in concept, however, is difficult in application, as the seating apparatus should preferably meet several specifications. First, the seating apparatus should be comfortable. Second, the seating apparatus should be quickly and easily removable to maintain the functionality of the truck bed when seating is not desired. Third, the seating apparatus must be securely fastened to the truck bed. Fourth, the seating apparatus should have minimal penetrations into the metal of the truck bed, as surface breaches can be source points for rust and corrosion. Fifth, the seating apparatus should have adjustable or modifiable seating arrangements. Sixth, the seating apparatus should have installation points located as near to the center of the truck bed as possible to minimize the detrimental effects on the seating apparatus during an accident, and also to minimize the potential for deformation of interior truck sidewalls during use of the seating apparatus. And finally, the seating apparatus should include secure seat belt attachment points.

Various attempts have been made to provide pickup truck bed seats that satisfy the foregoing desired specifications, but each such attempt is disadvantageous relative to the present invention in that none satisfy the specifications listed above. Therefore, it would be beneficial to have a truck bed seating apparatus that overcomes the limitations of the prior art, namely, that satisfies the need to have an apparatus that is comfortable, is quickly and easily removable, is securely fastened to the truck bed, has minimal penetrations into the metal of the truck bed, has adjustable or modifiable seating arrangements, has installation points located as near to the center of the truck bed as possible and has secure seat belt attachment points.

BRIEF SUMMARY OF THE INVENTION

This invention expands on the inherent versatility of a pickup truck by providing a modular design seating apparatus that enables a truck owner to quickly and securely attach or detach a removable $2^{nd}$ or $3^{rd}$ row passenger seating assembly to a cargo bed support structure.

Briefly described, in a preferred embodiment, the present invention overcomes the deficiencies of the prior art by satisfying the desired specifications for truck bed seats, wherein the present invention functions to provide a comfortable, readily removable, and secure seating apparatus that has minimal penetrations into the truck bed, has adjustable seating arrangements, has points of installation located near the truck bed centerline and has secure seat belt attachment points.

In a preferred embodiment of the present invention, the invention is a modular system having two main parts: a seating assembly and a base frame including a receiver assembly. Another embodiment that is further described herein has three main parts, wherein the base frame and the receiver assembly are individual component members. Other embodiments are also described, wherein variations to the base frame mounting brackets enable attachment to an UTILI-TRACK bed system, and to composite resin beds.

In the preferred embodiment, the base frame is removably attached to the floor of the truck bed by a plurality of bolts that extend from the truck bed support rail underneath the bed, through related apertures in the truck bed, and up through the base frame, wherein the bolts may be, for example, T-handle screws. This configuration provides a secure assembly upon which the seating assembly attaches.

According to the preferred embodiment, the seating apparatus is preferably constructed with attachment members located underneath the seat, wherein the attachment members are preferably bolted onto the base frame at designated points to attach the seating assembly to the base frame. Further, a plurality of integrally formed tabs or bosses are defined along the base frame in order to secure the seat belts, also, thereto.

In a further preferred embodiment of the present invention, shock absorbers are installed between the seating apparatus and base frame to reduce the transmission of vibrational energy to the user as well as reduce noise transmissions from the assembly. In a preferred embodiment of the present invention, the shock absorbers are rubber bushings, but any means of absorbing shock are considered to be within the scope of the present invention.

Accordingly, a feature and advantage of the present invention is its ability to provide an improved truck bed seating apparatus.

Another feature and advantage of the present invention is its ability to provide an improved truck bed seating apparatus wherein the seating arrangement can be modified to increase user comfort.

Still another feature and advantage of the present invention is its ability to provide an improved truck bed seating apparatus wherein the use of shock absorbers increases user comfort.

Yet another feature and advantage of the present invention is its ability to provide an improved truck bed seating apparatus wherein the base frame and seating apparatus are readily and quickly removable.

Yet still another feature and advantage of the present invention is its ability to provide an improved truck bed seating apparatus wherein once the seating apparatus and base frame are removed, minimal components remain permanently installed, thereby maximizing the usage of the truck bed.

A further feature and advantage of the present invention is its ability to provide an improved truck bed seating apparatus that can be adaptively secured to essentially any truck bed, including composite resin beds.

Another feature and advantage of the present invention is its ability to provide an improved truck bed seating apparatus that can be secured to an UTILI-TRACK bed system.

Still a feature and advantage of the present invention is its ability to provide an improved truck bed seating apparatus wherein the number of penetrations into the truck bed are minimized.

Yet still a further feature and advantage of the present invention is its ability to provide an improved truck bed seating apparatus wherein the center-line of the apparatus is either at or in close proximity to the truck bed center-line.

Yet another feature and advantage of the present invention is its ability to provide a secure seat belt assembly and attachment.

Still another feature and advantage of the present invention is that the design does not require touch or contact with any interior sidewalls of the truck bed, thereby avoiding limitations on the use of other truck accessories These and other objects, features, and advantages of the invention will become more apparent to those ordinarily skilled in the art after reading the following Detailed Description and Claims in light of the accompanying drawing Figures.

BRIEF DESCRIPTION OF THE DRAWINGS

Accordingly, the present invention will be understood best through consideration of, and reference to, the following Figures, viewed in conjunction with the Detailed Description of the Preferred Embodiment referring thereto, in which like reference numbers throughout the various Figures designate like structure and in which.

It is to be noted that the drawings presented are intended solely for the purpose of illustration and that they are, therefore, neither desired nor intended to limit the invention to any or all of the exact details of construction shown, except insofar as they may be deemed essential to the claimed invention.

DETAILED DESCRIPTION OF THE INVENTION

In describing preferred embodiments of the present invention illustrated in the Figures, specific terminology is employed for the sake of clarity. The invention, however, is not intended to be limited to the specific terminology so selected, and it is to be understood that each specific element includes all technical equivalents that operate in a similar manner to accomplish a similar purpose.

Figure 1:
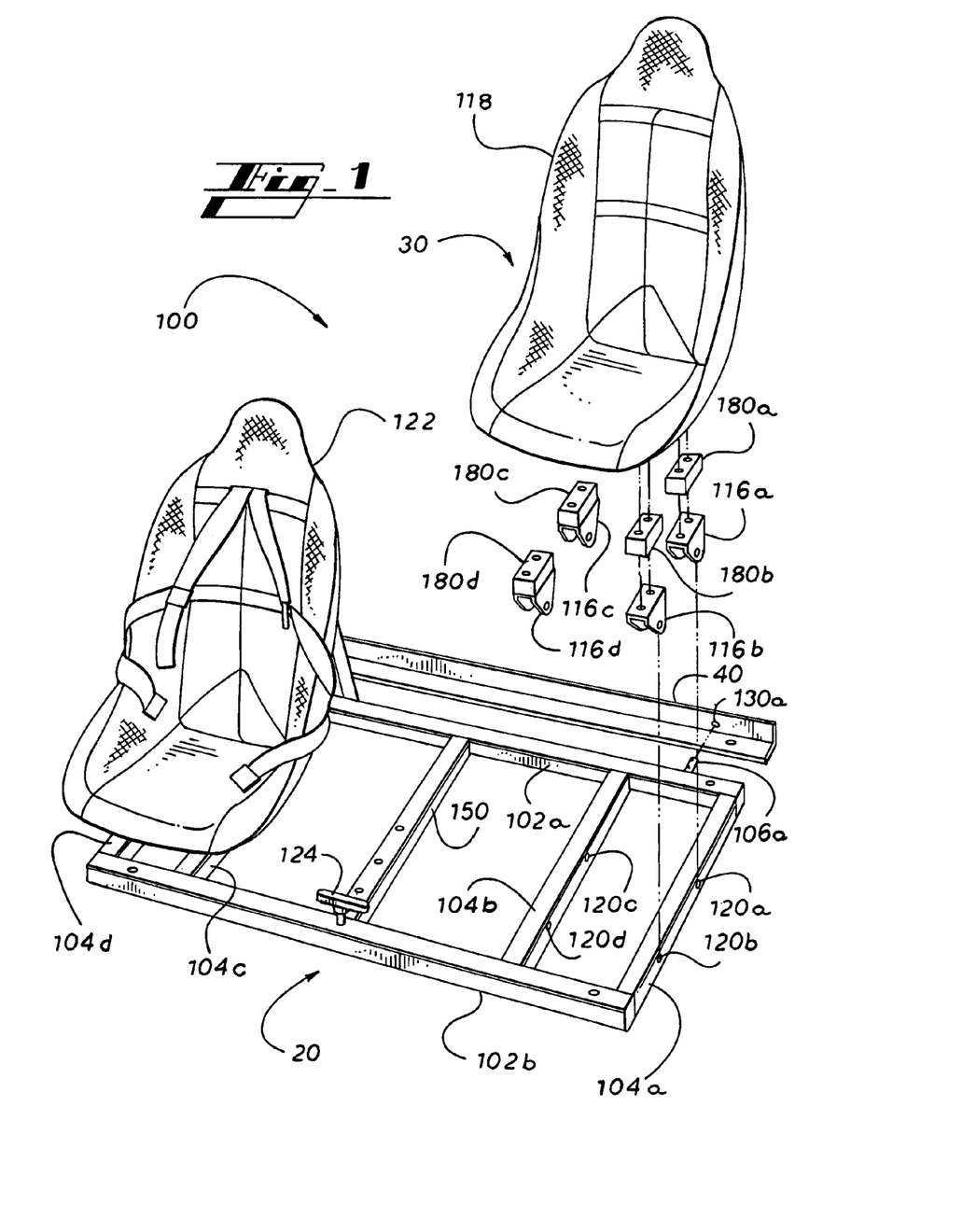
FIG. 1 is a perspective elevation view of a truck bed seating apparatus, according to an alternate embodiment of the present invention.
Figure 2:
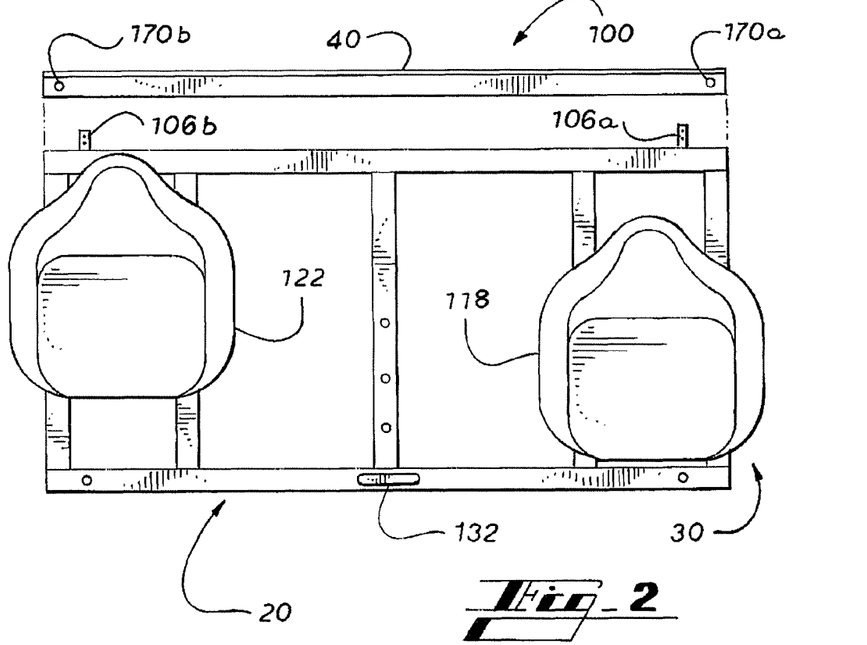
FIG. 2 is an overhead view of the truck bed seating apparatus of FIG. 1.

In that form of the present invention chosen for purposes of initial illustration, FIG. 2 shows alternate truck bed seating assembly 100, generally comprising base frame 20, seat assembly 30, removably attached thereto, and receiver assembly 40. According to this first alternate embodiment, base frame 20 provides the structure upon which seat assembly 30 is mounted, and is composed of a plurality of members assembled in a plane. More specifically, and referring now to FIG. 1, base frame 20 is defined by rear member 102*a*, aligned parallel to front member 102*b*, wherein both rear member 102*a* and front member 102*b* are aligned perpendicular to truck bed sidewalls upon installation, as shown in further detail in FIG. 4. Although according to the presently described embodiment, base frame 20 is constructed from a plurality of members, it is anticipated that base frame 20 may also be of unitary construction. Further, while steel is the preferred construction material, it is anticipated that the members of base frame 20 may be constructed of other suitable materials.

In order to accommodate installation within a truck bed, rear member 102*a* and front member 102*b* are shorter in length than the cross-width, or diameter of the truck bed, wherein an optimum relationship for the presently described embodiment exists if rear member 102*a* and front member 102*b* are each approximately 8 inches shorter than the interior cross-width or diameter of the truck bed, thereby providing for a 4 inch clearance between either side of frame 20 and the truck bed sidewall. This length differential allows for the maximum area for various seating arrangements, while minimizing the weight of frame 20, though it is anticipated that various lengths may be used for any or all of the embodiments described herein without departing from the intended scope of the present invention.

Frame 20 is further defined by parallel support members 104*a-d*, wherein members 104*a-d* are aligned normal to both rear member 102*a* and front member 102*b*. Members 104*a-d* may also be independently formed and bolted to 102*a,b*, wherein any means of attachment is anticipated and intended to be within the scope of this invention. Additionally, the location at which members 104*a-d* are shown welded to members 102*a,b* is not intended to be limiting, as the locations are variable based upon user preference. Further, and as shown in FIGS. 1 and 2, optional member 150 may be included for additional structural support, as well as for support of further optional items, such as, for exemplary purposes only, a console or storage bin.

Figures 4, 5:
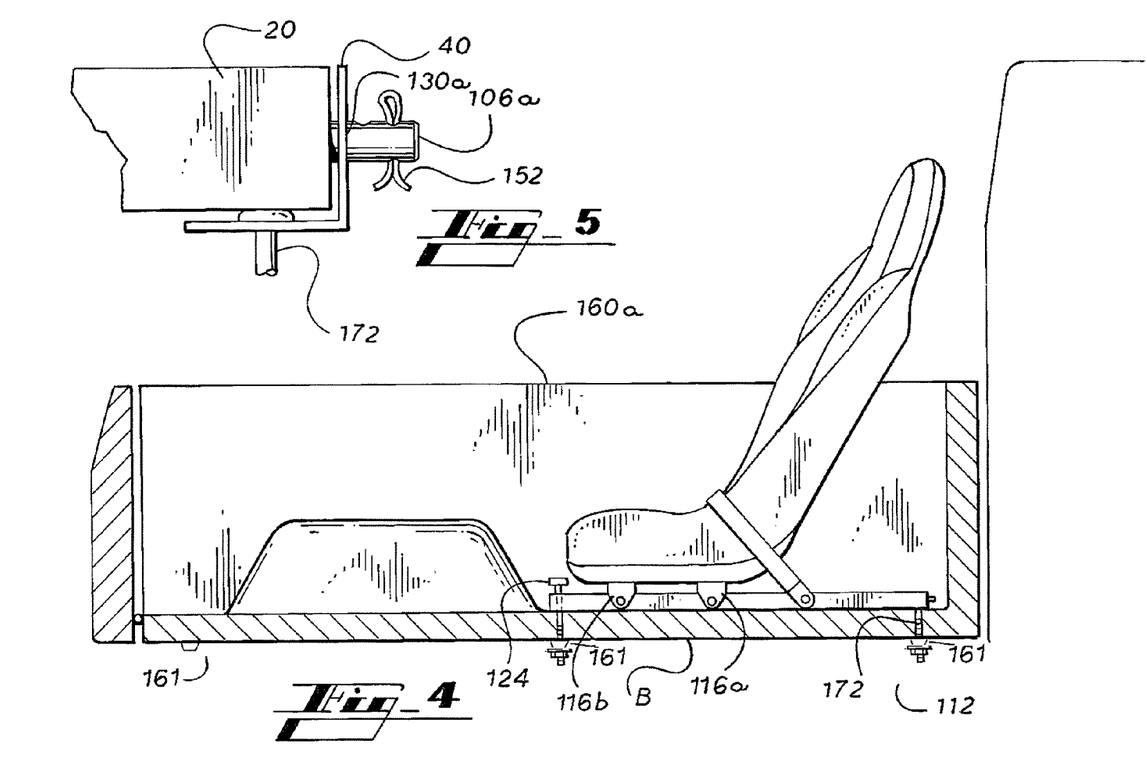
FIG. 4 is a side view of the truck bed seating apparatus of FIG. 1, showing the apparatus installed in a truck bed.
FIG. 5 is a close-up, cutaway end view of a receiver assembly, according to an alternate embodiment of the present invention, showing the receiver assembly attached to a truck bed and to a base frame.

Receiver assembly 40 has two flat planar surfaces normal to each other, wherein one flat planar surface sits flush with the truck bed B and the other flat planar surface acts as a backstop to secure frame 20. Thus, to attach and secure frame 20 to truck bed 162, as shown in FIG. 4, receiver assembly 40 is first secured to truck bed B via plurality of bolts 172, as shown in FIGS. 4 and 5, and related plurality of nuts 112. Thereafter, as shown in FIGS. 2 and 5, frame 20 is removably attached to receiver assembly 40 via engagement members 106a and 106b and related cotter pins 152. Apertures 130a,b are defined through receiver assembly 40 in order to facilitate passage of engagement members 106a,b, respectively, therethrough for lockable engagement with cotter pins 152. It should be noted that other means of preventing the disengagement of engagement members 106a,b from receiver assembly 40 are also anticipated, in addition to and/or in lieu of cotter pins 152 and considered within the scope of this invention.

Figure 3:
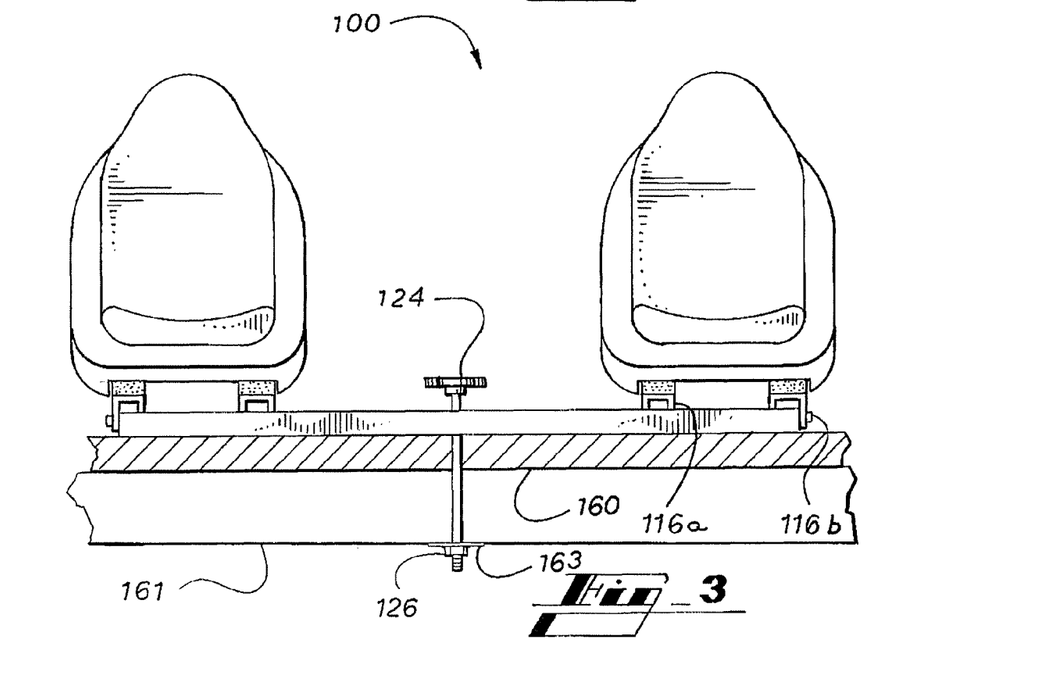
FIG. 3 is front view of the truck bed seating apparatus of FIG. 1.

Base frame 20 further comprises aperture 132 (shown in FIG. 2), wherein T-handle bolt 124 extends therethrough in order to further secure base frame 20 to truck bed B. As shown in FIG. 3, T-handle bolt 124 is inserted through frame 20 and truck bed B and secured via nut 126. Thus, as shown in FIG. 4, when installed, T-handle bolt 124 is also engaged with a truck bed receiving assembly 161, or anchor plate 163 located on the underside of truck bed B.

According to the presently described embodiment, and with reference to FIGS. 1, 3 and 4, seat 118 of seat assembly 30 is attached to base frame 20 via securing members 116a-d, wherein securing members 116a-b are attached to parallel support member 104a, and securing members 116c-d are attached to parallel support member 104b at attachment points 120a-d, respectively. In this described first alternate embodiment of the present invention, securing members 116a-d are constructed from "U"-shaped hardened steel, however other shapes and materials could be utilized, as appropriate. The "U" shape facilitates a parallel overlay installation positioning for securing members 116a-d relative to support members 104a-b, thereby providing for a strong, double-sided attachment for each securing member 116a-d. Other shapes and configurations could be utilized for securing members 116a-d and/or same could be integrally defined on the base of seat 118. Thus, it should be recognized by one skilled in the art that the method of attachment of seat assembly 30 to base frame 20 could be alternately accomplished via any appropriate bracket or adaptor device of suitable strength.

As shown in FIG. 1, to provide additional rider comfort, rubber bushings 180a-d may be inserted between seat 118 and securing members 116a-d, respectively, in order to provide additional vibrational absorption, although the shock absorbers on the truck provide some degree of comfort. Further, although rubber bushings 180a-d are described, any means of absorbing shock, such as, for exemplary purposes, springs, hydraulics, or any other suitable resilient component is considered to be within the scope of the present invention.

Figure 6:
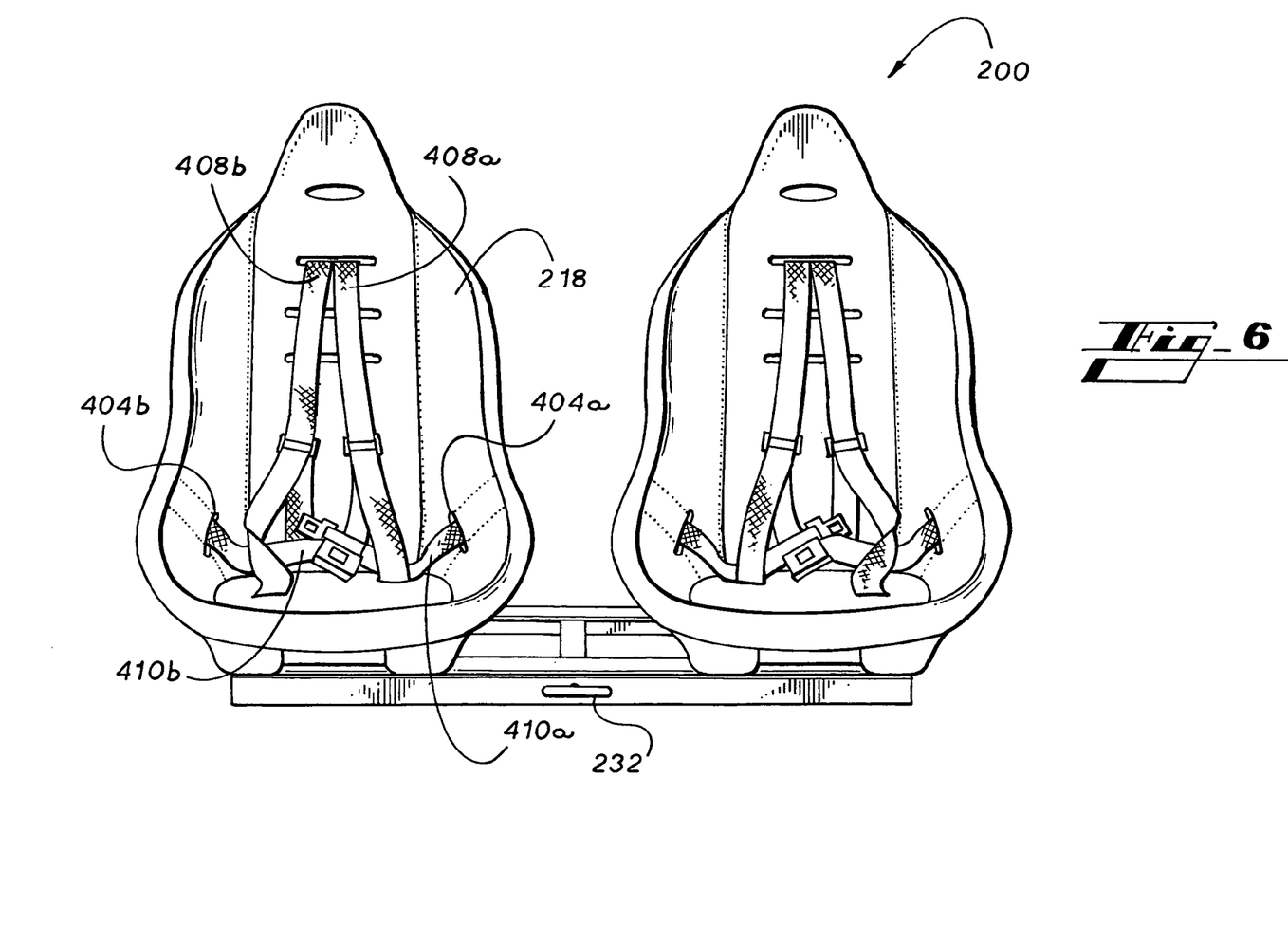
FIG. 6 is a front view of the truck bed seating apparatus, according to the preferred embodiment of the present invention.
Figure 7:
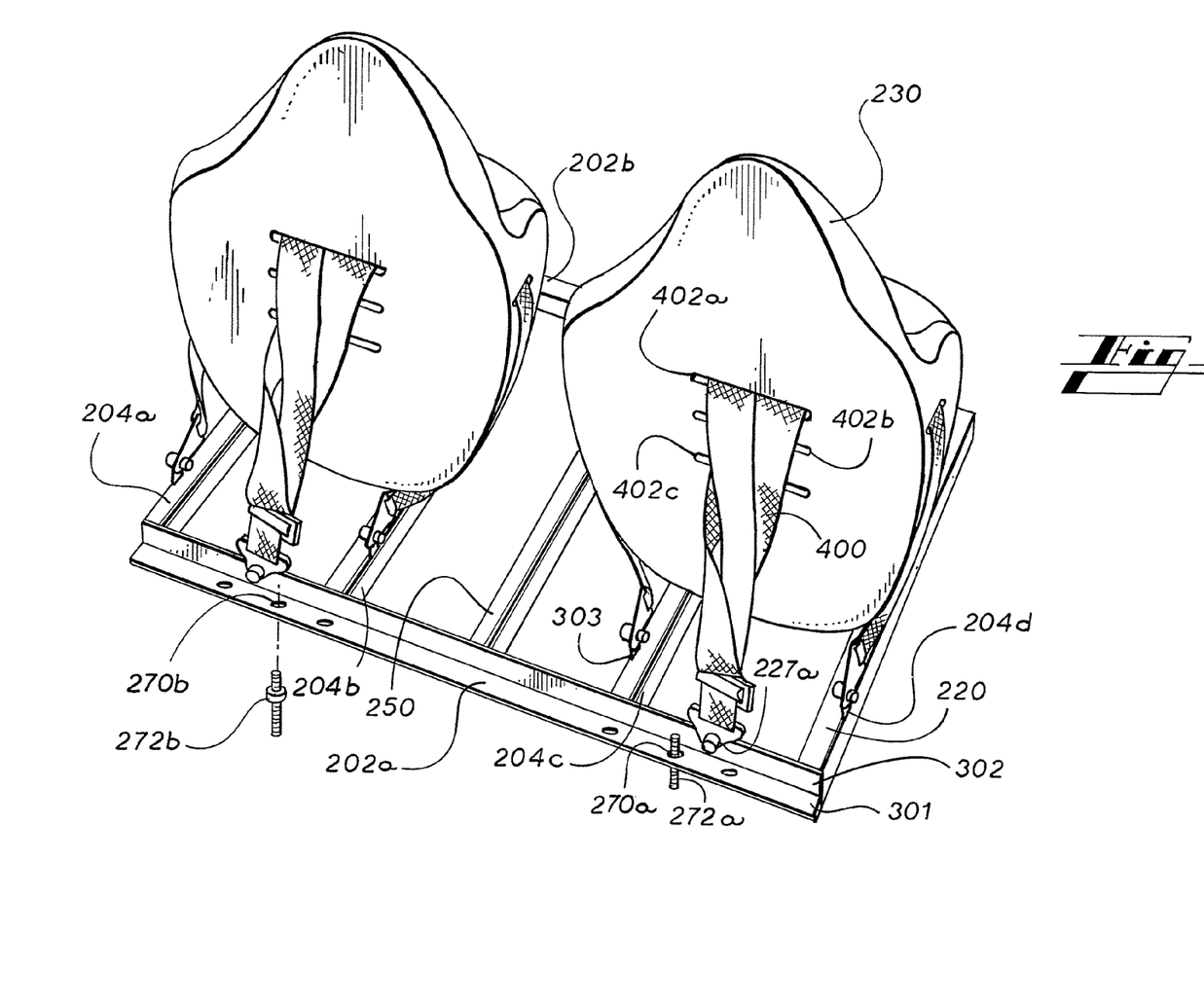
FIG. 7 is a rear, overhead perspective view of a truck bed seating apparatus of FIG. 6.

Now, referring to the preferred embodiment of the present invention, as shown in FIGS. 6-7, truck bed seating assembly 200 is comprised of base frame 220 and seating assembly 230. Preferred base frame 220 is preferably of one-piece welded steel construction, and is preferably rectangularly shaped, as defined by rear member 202a, front member 202b, first side member 204a, and second side member 204d. Also preferably, inner cross-support members 204b and 204c extend from rear member 202a and front member 202b, between first side member 204a and second side member 204d. Further, and also preferably, central cross-support member 250 also extends from between rear member 202a and front member 202b, preferably in a central location between inner cross-support members 204b and 204c. Although other arrangements could be effective, this preferred configuration for base frame 220 facilitates easy and secure placement of seating assembly 230 thereon, as more fully explained herein.

In the preferred configuration of base frame 220, rear member 202a preferably defines bed wall 301 and frame wall 302, wherein bed wall 301 and frame wall 302 define the preferred "L"-shaped cross-section of rear member 202a. Again, although other configurations could be effective, this preferred configuration for rear member 202a facilitates secure attachment of base frame 220 to a truck bed B, while also facilitating secure attachment of seatbelt assembly 400 to base frame 220, as seen in FIG. 7. Preferably, fastening apertures 270a and 270b are defined through bed wall 301 to enable passage of fasteners 272 therethrough, as further described hereinbelow. Additionally, similarly to previously described alternate embodiment 100, front member 202b of preferred base frame 220 further comprises aperture 232, wherein T-handle bolt 124 extends therethrough in order to further secure base frame 220 to truck bed B.

Also according to the preferred configuration of base frame 220, each first side member 204a, second side member 204d, and inner cross-support member 204b and 204c preferably includes a preferably integrally formed tab or boss 303, preferably defined at a location therealong in order to facilitate secure attachment of seatbelt assembly 400 to base frame 220, as shown in FIG. 7.

According to the preferred embodiment, seating assembly 230 includes seat 218, wherein the preferred configuration for seat 218 includes plurality of user-selectable back apertures 402a-c and arm apertures 404a-b. The dimensions of back apertures 402a-c and arm apertures 404a-b are preferably such that portions of seatbelt assembly 400 can pass therethrough, wherein preferably, seatbelt assembly 400 is a racing style configuration, comprising dual-member shoulder harness 408a and 408b and cooperating lap members 410a and 410b. Accordingly, the preferred arrangement of seatbelt assembly 400 relative to seat 218 is defined by dual-member shoulder harness 408a and 408b extending through one of the plurality of user-selectable back apertures 402a-c, by lap member 410a extending through arm aperture 404a, and by lap member 410b extending through arm aperture 404b. Preferably, lap members 410a and 410b are secured to base frame 220 via bosses 303, and preferably, dual-member shoulder harness 408a and 408b is secured to base frame 220 via frame wall 302.

The aforementioned preferred configuration for attachment of seatbelt assembly 400 to base frame 220 has been professionally and independently tested for confirmation of static load performance, and for evaluation relative to federal standards. Specifically, testing via application of 5000 lb. force to each boss 303, for a total of 10,000 lb., and application of a load of 1000 lb. in the opposite direction, to the back of seat 218, showed no failure for any of the attachment points along base frame 220 for seat 218 via securing members 116a-d, and no failure of bosses 303.

According to the preferred embodiment, and similarly to previously described alternate embodiment 100, seat 218 of seat assembly 230 is attached to base frame 220 via securing members 116a-d, wherein securing members 116a-b are attached to parallel support member 204a, and securing members 116c-d are attached to parallel support member 204b, at attachment points 220a-d, respectively. As previously described, securing members 116a-d are preferably constructed from "U"-shaped hardened steel in order to facilitate overlay installation positioning relative to support members 204a-b, but, again, as previously noted, other shapes and configurations could alternately be utilized, either with or without shock absorbing characteristics.

The preferred configuration for truck bed seating apparatus 200 enables quick and easy removal from a truck bed B, whereupon only two bolts 272a, 272b remain in truck bed B when truck bed seating apparatus 200 is not installed for use therein.

Figure 8:
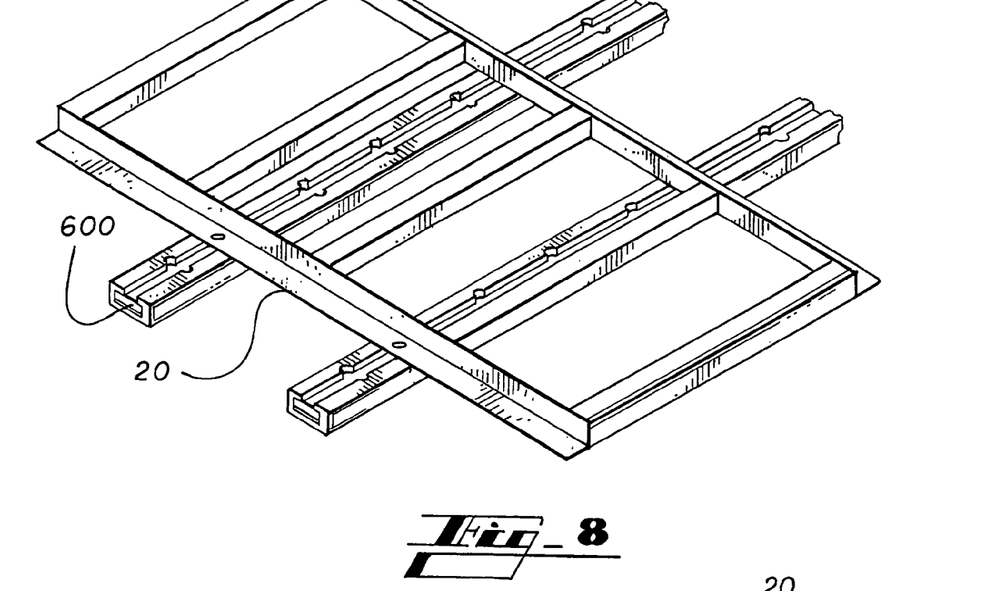
FIG. 8 is a partial, overhead view of a truck bed seating apparatus of the present invention, according to an alternate embodiment, showing the base frame secured to an UTILI-TRACK bed system.
Figure 9:
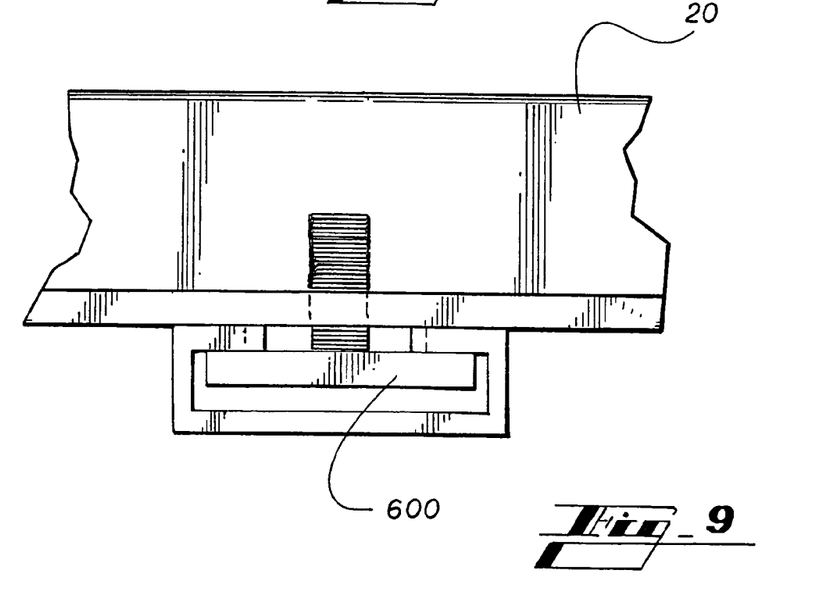
FIG. 9 is a cutaway, side view of a UTILI-TRACK mounting stud, according to the alternate embodiment of FIG. 8.

Alternate installation configurations are intended, wherein, for example, in lieu of bolts 272a, 272b, UTILI-TRACK adaptors, or mounting studs 600 can be utilized to enable installation of truck bed seating apparatus 200 in an UTILI-TRACK equipped truck bed, as shown in FIGS. 8-9. In such an embodiment, as shown in FIG. 8, rear member 202a and front member 202b of base frame 220 both define bed wall 301 and frame wall 302, wherein bed wall 301 and frame wall 302 define the preferred "L"-shaped cross-section of rear member 202a and front member 202b, similar to that shown in FIG. 7. This configuration facilitates secure attachment of base frame 220 to the UTILI-TRACK bed system, wherein any suitable cap or nut may be utilized for fixing the final installed placement of mounting stud 600 relative to the UTILI-TRACK bed system.

Having, thus, described exemplary embodiments of the present invention, it should be noted by those skilled in the art that the within disclosures are exemplary only and that various other alternatives, adaptations, and modifications may be made within the scope and spirit of the present invention. Accordingly, the present invention is not limited to the specific embodiments as illustrated herein, but is only limited by the following claims.

I claim:

1. A truck bed seating apparatus, comprising:
    a base frame further comprising
        a front elongate member,
        a rear elongate member, and
        two opposingly positioned side elongate members,
        wherein said front elongate member is perpendicular to said two side elongate members and
        said front elongate member is parallel to said rear elongate member,
        wherein said rear elongate member is perpendicular to said two side elongate members, and
        wherein said two opposingly positioned side elongate members are parallel to each other,
        said base frame having a rectangular periphery defined by said elongate members,
        said base frame further comprising a plurality of inner cross-support members positioned within said rectangular periphery defined by said elongate members,
        wherein said plurality of inner cross-support members are parallel to said two side elongate members, and
        wherein said plurality of inner cross-support members extend between said front elongate member and said rear elongate member and are perpendicular thereto,
        said base frame removably and directly secured to a truck bed workpiece that is supported by truck support rails on a truck bed receiving assembly, wherein said elongate members and said plurality of inner cross-support members of said base frame are carried proximate a floor of the truck bed workpiece, and
        said base frame further comprising a plurality of bosses extending therefrom; and
    a seat, said seat further comprising a plurality of securing members proximate a base of said seat, and said seat securely attached to said base frame by attachment of said plurality of securing members to one of said two side elongate members and to at least one of said plurality of inner cross-support members,
    wherein said seat further comprises a seat belt harness defined by a dual-shoulder belt and a lap belt having two interlocking members, wherein said dual-shoulder belt extends through an aperture defined in a seat back of said seat and each said member of said two interlocking members of said lap belt extends through an aperture defined in a seat arm, and
    wherein said dual-shoulder belt is securely fastened to one said boss on said rear member of said base frame, one said member of said two interlocking members of said lap belt is securely fastened to one said boss on one of said two side elongate members of said base frame, and another said member of said two interlocking members of said lap belt is securely fastened to one said boss on one of said plurality of inner cross-support members of said base frame.

2. The truck bed seating apparatus of claim 1, wherein one or more shock absorbent members are positioned between each of said plurality of securing members of said seat and said base frame.

3. The truck bed seating apparatus of claim 1, wherein said base frame further comprises a plurality of apertures defined through said front elongate member and said rear elongate member, one or more of said plurality of apertures removably carrying a bolt that extends between and secures the truck support rails, the truck bed, and the base frame together.

4. The truck bed seating apparatus of claim 1, wherein said base frame is secured to the truck bed workpiece via fasteners extending between said base frame, the truck bed workpiece and the support rails for the truck bed workpiece.

5. A truck bed seating apparatus, comprising:
    a base frame further comprising
        a front elongate member,
        a rear elongate member, and
        two opposingly positioned side elongate members,
        wherein said front elongate member is perpendicular to said two side elongate members and
        said front elongate member is parallel to said rear elongate member,
        wherein said rear elongate member is perpendicular to said two side elongate members, and
        wherein said two opposingly positioned side elongate members are parallel to each other,
        said base frame having a rectangular periphery defined by said elongate members, and
        said base frame further comprising a plurality of inner cross-support members positioned within said rectangular periphery defined by said elongate members,
        wherein said plurality of inner cross-support members are parallel to said two side elongate members, and
        wherein said plurality of inner cross-support members extend between said front elongate member and said rear elongate member and are perpendicular thereto,
        said base frame removably and directly secured to a truck bed workpiece that is supported by truck support rails on a truck bed receiving assembly, wherein said elongate members and said plurality of inner cross-support members of said base frame are carried proximate a floor of the truck bed workpiece; and
    a seat, said seat further comprising a plurality of securing members proximate a base of said seat, and said seat securely attached to said base frame by attachment of said plurality of securing members to one of said two side elongate members and to at least one of said plurality of inner cross-support members, wherein each of said plurality of securing members further comprises a U-shaped securing member, wherein each of said U-shaped securing members partially surrounds said base frame and is attached between said base frame and said seat.

6. The truck bed seating apparatus of claim 5, wherein one or more shock absorbent members are positioned between each of said plurality of securing members of said seat and said base frame.

7. The truck bed seating apparatus of claim 5, wherein said base frame further comprises a plurality of apertures defined through said front elongate member and said rear elongate member, one or more of said plurality of apertures removably carrying a bolt that extends between and secures the truck support rails, the truck bed, and the base frame together.

8. The truck bed seating apparatus of claim 5, wherein said base frame is secured to the truck bed workpiece via fasteners extending between said base frame, the truck bed workpiece and the support rails for the truck bed workpiece.

* * * * *